United States Patent [19]

Suenaga et al.

[11] Patent Number: 5,129,478
[45] Date of Patent: Jul. 14, 1992

[54] SEAT OCCUPANT RESTRAINING DEVICE

[75] Inventors: Koji Suenaga; Osamu Uno; Koji Hirose, all of Osaka, Japan

[73] Assignee: Toyo Umpanki Co., Ltd., Osaka, Japan

[21] Appl. No.: 560,564

[22] Filed: Jul. 31, 1990

[51] Int. Cl.⁵ .................................................. B60R 21/00
[52] U.S. Cl. ................................ 180/268; 280/748; 297/487
[58] Field of Search .............. 280/748, 751, 753, 801; 180/268, 269, 286, 271; 297/284, 487, 488, 464, 284 FF, 284 G, 486; 49/122, 123, 109

[56] References Cited

U.S. PATENT DOCUMENTS

| | | | |
|---|---|---|---|
| 3,700,281 | 10/1972 | Servadio | 297/486 |
| 4,300,788 | 11/1981 | Sperling | 280/748 |
| 4,500,136 | 2/1985 | Murphy et al. | 297/284 |
| 4,579,191 | 4/1986 | Klee et al. | 180/268 |

Primary Examiner—Charles A. Marmor
Assistant Examiner—Paul Dickson
Attorney, Agent, or Firm—Griffin Branigan & Butler

[57] ABSTRACT

A restraining device for limiting forward movement of an operator of a wheeled mechanical vehicle in case of a collision includes two restraining bars pivotally mounted at opposite sides of a seat and extending toward one another. The restraining bars are mounted so as to pivot in a vertical plane about axes which are parallel to each other and lie on opposite sides of the seat. The restraining bars are synchronized or interlocked so that when one bar is raised or lowered by the occupant of the seat the other bar is also moved. A lock or retention device on one side of the seat holds the restraining bars in the lowered or raised position after they have been positioned by the occupant. The vehicle may be a forklift or front end loader and the run controls and load controls of the vehicle are interlocked with the synchronizing mechanism so that the run and load controls cannot be operated when the restraining bars are not in the occupant restraining position.

13 Claims, 4 Drawing Sheets

SEAT OCCUPANT RESTRAINING DEVICE

FIELD OF THE INVENTION

The present invention relates to restraining devices of the type which prevent a seat occupant from being thrown forwardly upon impact of a vehicle with some object. More particularly, the invention relates to restraining devices of the bar type suitable for use in restraining the forward movement of operators of forklifts, front end loaders, tractor shovels and similar devices in the event of an accident.

BACKGROUND OF THE INVENTION

A typical prior art restraining device such as that disclosed in Jikkai Sho 61-132146 comprises a fixed side, a seat secured to the fixed side, and right and left arm bars. The right and left arm bars are pivotally attached to the fixed side at points located behind the seat so that they may pivot in vertical planes about an axis extending transverse to the front-to-rear axis of the vehicle. At the free end of each of the arms a horizontal bar is provided and when the right and left arm bars are lowered the horizontal bars extend toward each other across the front of the operator. This arrangement is bulky and gives the operator a sense of confinement. Also, it requires a relatively strong lifting force and long lifting stroke.

SUMMARY OF THE INVENTION

An object of the present invention is to provide a seat occupant restraining device which is relatively small, does not give an occupant a sense of being confined, and is easy to operate.

An object of the invention is to provide a vehicle seat occupant restraining device comprising a fixed side, a seat secured to the fixed side, right and left horizontal bars pivotally connected to the fixed side on opposite sides of the seat so as to pivot up and down on axes which are parallel to the front-to-rear axis of the vehicle, and a synchronizing means for synchronizing the movements of the horizontal bars whereby the raising or lowering of one bar causes a raising or lowering of the other bar.

A further object of the invention is to provide a vehicle seat occupant restraining device as described above and further comprising a locking means for retaining or holding the bars in both a lowered position and a raised position.

Another object of the invention is to provide a vehicle seat occupant restraining device as described above in combination with mechanisms interlocked with the run and load controls of the vehicle whereby the vehicle will not run and the vehicle load control apparatus cannot be operated when the horizontal bars are raised out of their occupant restraining position.

Other objects of the invention and its mode of operation will become apparent upon consideration of the following description and the accompanying drawings.

DETAILED DESCRIPTION OF THE INVENTION

Figure 1:
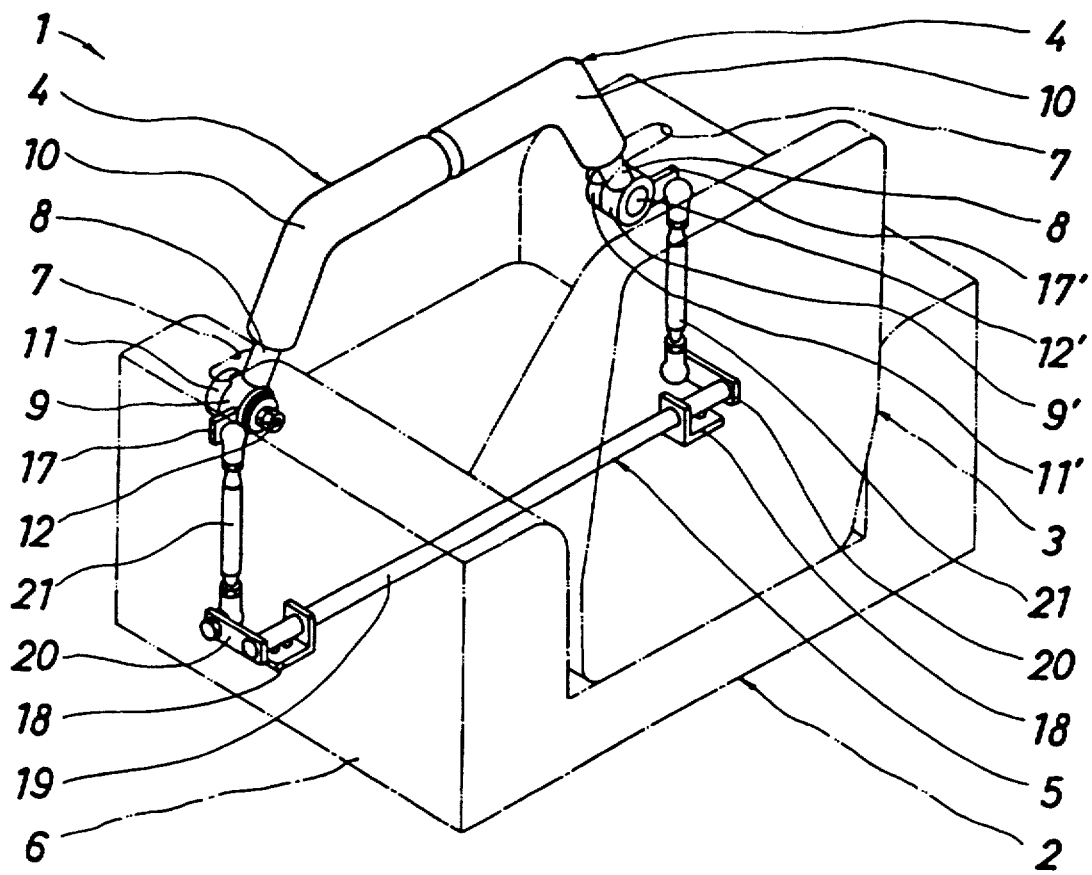
FIG. 1 is a perspective view of a vehicle seat occupant restraining device according to a first embodiment of the invention.

In FIG. 1, a vehicle seat occupant restraining device 1 comprises an operator's seat 3 secured within the well of a U-shaped cover member 6. The seat and cover member are secured to a fixed side, generally indicated by numeral 2, which may be the frame or sturdy body members of a forklift, front-end loader, tractor shovel or similar vehicle. The arms of the U-shaped cover member 6 serve as arm rests for the operator and each is provided with a cut-out 7 to permit free movement of a restraining bar 8 as it pivots about or moves along an axis 12 located within the cover member.

There are two restraining bars 8, one pivoted within cover 6 to the left of seat 3 as viewed in FIG. 1 and the other pivoted within cover 6 to the right of seat 3. Each restraining bar has a horizontal portion which is free at one end and a second portion extending downwardly at an angle to an end which pivots about an axis within cover 6. Each restraining bar 8 is provided with a cover or padding 10 so as to form a restraining bar assembly 4.

The pivot end of the left restraining bar 8 has a boss 9 attached thereto. The boss 9 is mounted for pivoting movement about axle bolt 12 A second boss 11 is secured to the fixed side 2 by conventional means such as a bracket (not shown) and axle bolt 12 extends through openings in bosses 9 and 11.

Bosses 9 and 11, together with axle bolt 12 and a compression spring 14 (FIG. 2) comprise a holding or locking means 13 for locking the arms 8 in position. A washer 12a and nuts 12b are provided for retaining the compression spring 14.

Figure 2:
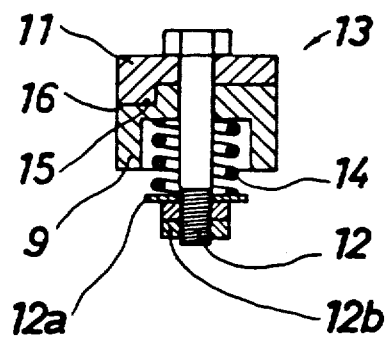
FIG. 2 is an enlarged sectional view of a locking means for a horizontal bar, the locking means being shown in a locking state.

FIG. 2 illustrates the holding means 13 when the restraining bars 8 are in the restraining position illustrated in FIG. 1. In this position the compression spring exerts on one hand a force against washer 12a which pulls the head of axle bolt 12 against the fixed boss 11, and exerts on the other hand a force against the pivoting boss 9 tending to move it toward the fixed boss 11. Boss 11 has a projecting portion 16 which engages a recessed portion 15 on boss 9 thereby preventing rotation of boss 9 relative to fixed boss 11. Since boss 9 is attached to the left restraining bar 8, this means that the restraining bar cannot be raised when the projecting portion 16 engages the recessed portion 15.

Figure 3:
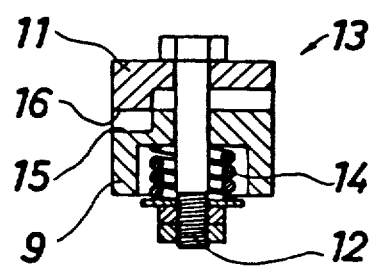
FIG. 3 is an enlarged sectional view of a locking means for a horizontal bar, the locking means being shown in an unlocked state.

To move the left restraining bar 8 out of its restraining position, the operator grasps the bar 8 and pulls it toward himself. The boss 9 slides along axle bolt 12 and as it moves compression spring 12 is compressed and projection 16 is disengaged from recess 15, as illustrated in FIG. 3. The operator then raises the left restraining bar 8 which, with boss 9, pivots about axle bolt 12.

The boss 9 is provided with a second recessed portion (not shown) with which the projection 16 may interfit when the restraining bar 8 is fully raised. Thus, after an operator raises the restraining bar to its fully opened position he may release the bar and it will remain in the raised position because the compression spring 14 will urge boss 9 toward boss 11 so that projection 16 engages the second recess thereby preventing rotation of the boss 9. The operator may then leave the seat 3.

If the restraining bars are in the raised position, an operator may take a seat, grasp the left restraining bar assembly 4, pull it toward himself, lower the bar until it is in its restraining position, and release it. At this time the holding means 13 will again be in the position illustrated in FIG. 2 thereby securely locking the restraining bar.

A synchronizing or interlock mechanism 5 is provided for synchronizing movement of the restraining bars 8 so that when the left bar is raised or lowered the other bar is raised or lowered. The synchronizing means comprises, at each side of seat 3, an arm 17, a bearing 18, an arm 20 and an adjustable link 21. Arm 17 is secured to boss 9 so as to rotate therewith when restraining bar 8 is raised or lowered. Adjustable link 21 is connected at one end to the arm 17 and at the other end at the other end it is connected to one end of arm 20. Ball and socket or swivel arrangements in each end of the adjustable link 21 permit it to pivot freely with respect to both arm 17 and arm 20. The other end of arm 20 is securely attached to a rod 19 that is mounted for free rotational movement in the bearings 18 secured to the fixed side 2.

At the right side of the operator's seat 3, the top end of adjustable link 21 is pivotally connected to an arm 17' secured to a boss 9'. The right restraining bar 8 is attached to boss 9' and the boss is free to pivot about a pivot pin 12'. The pivot pin is supported by a boss 11' that is attached to the fixed side 2.

The bosses 9' and 11' differ from bosses 9 and 11 in that bosses 9' and 11' do not have the recesses 15 and projections 16. Thus, the pivot pin 12' need not carry washers and a compression spring like those provided on axle bolt 12.

The synchronizing mechanism operates as follows. When the operator wishes to leave seat 3, he pulls back on the left restraining bar assembly 4 thereby freeing the holding means 13 by moving boss 9 away from boss 11. Because of the ball and socket pivots at each end of both adjustable links 21, this produces no perceptible movement of boss 9'. Next, the operator raises the left restraining bar assembly 4. As the left bar assembly 4 is raised, it pivots boss 9 thereby pivoting arm 17 downwardly. The movement of arm 17 is transmitted through the left adjustable link 21 and arm 20 to rotate rod 19.

At the right side, rotation of rod 19 pivots left arm 20 downwardly. This pulls the right adjustable link 21 downwardly and the upper end of the link pulls on arm 17' thereby rotating boss 9' in the clockwise direction as viewed in FIG. 1. Since the right restraining arm 8 is attached to boss 9', the arm is raised as the boss rotates clockwise. Thus, by operating only the left restraining bar assembly 4 the operator may raise both restraining bar assemblies thereby freeing himself to leave the seat 3.

When the operator enters seat 3 he may pull back on the left restraining bar assembly 4 and then lower it. The backward pull produces no movement of the right restraining bar assembly but the subsequent lowering of the left restraining bar assembly also causes the right restraining bar assembly to be lowered. The manner in which this is accomplished by the synchronizing means is obvious from the foregoing description.

Figure 4:
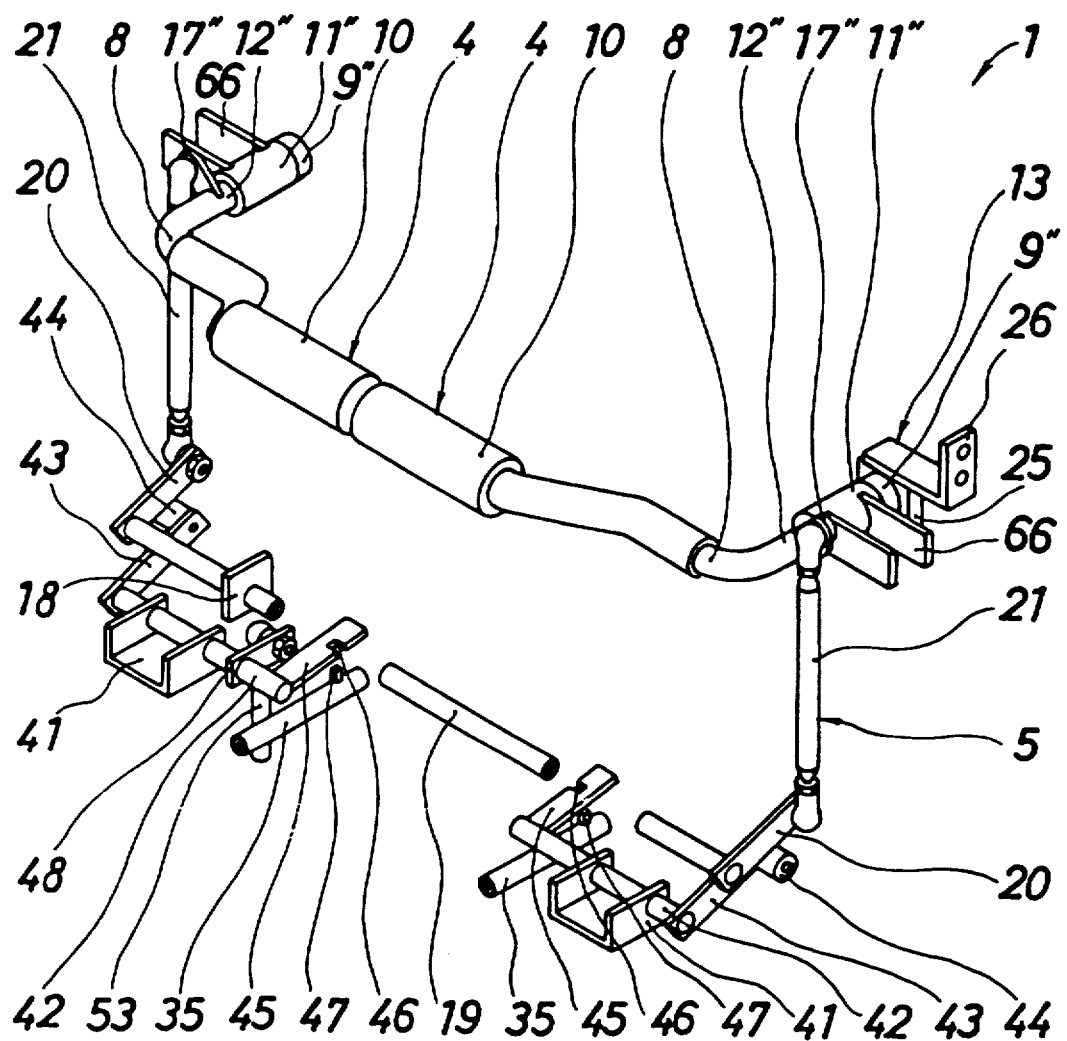
FIG. 4 is a perspective view of a second embodiment of the invention.
Figure 5:
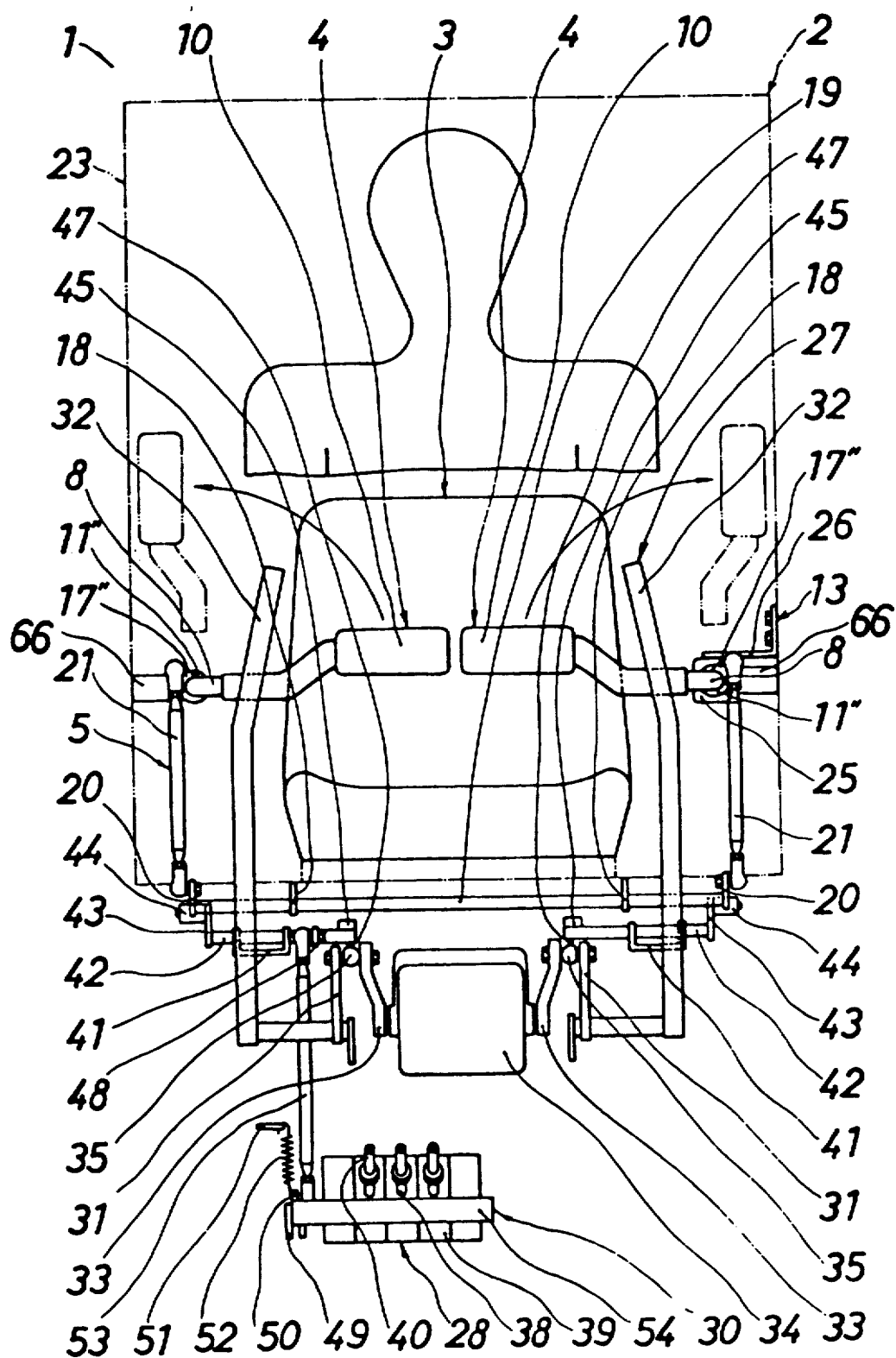
FIG. 5 is a front view of the second embodiment.
Figure 6:
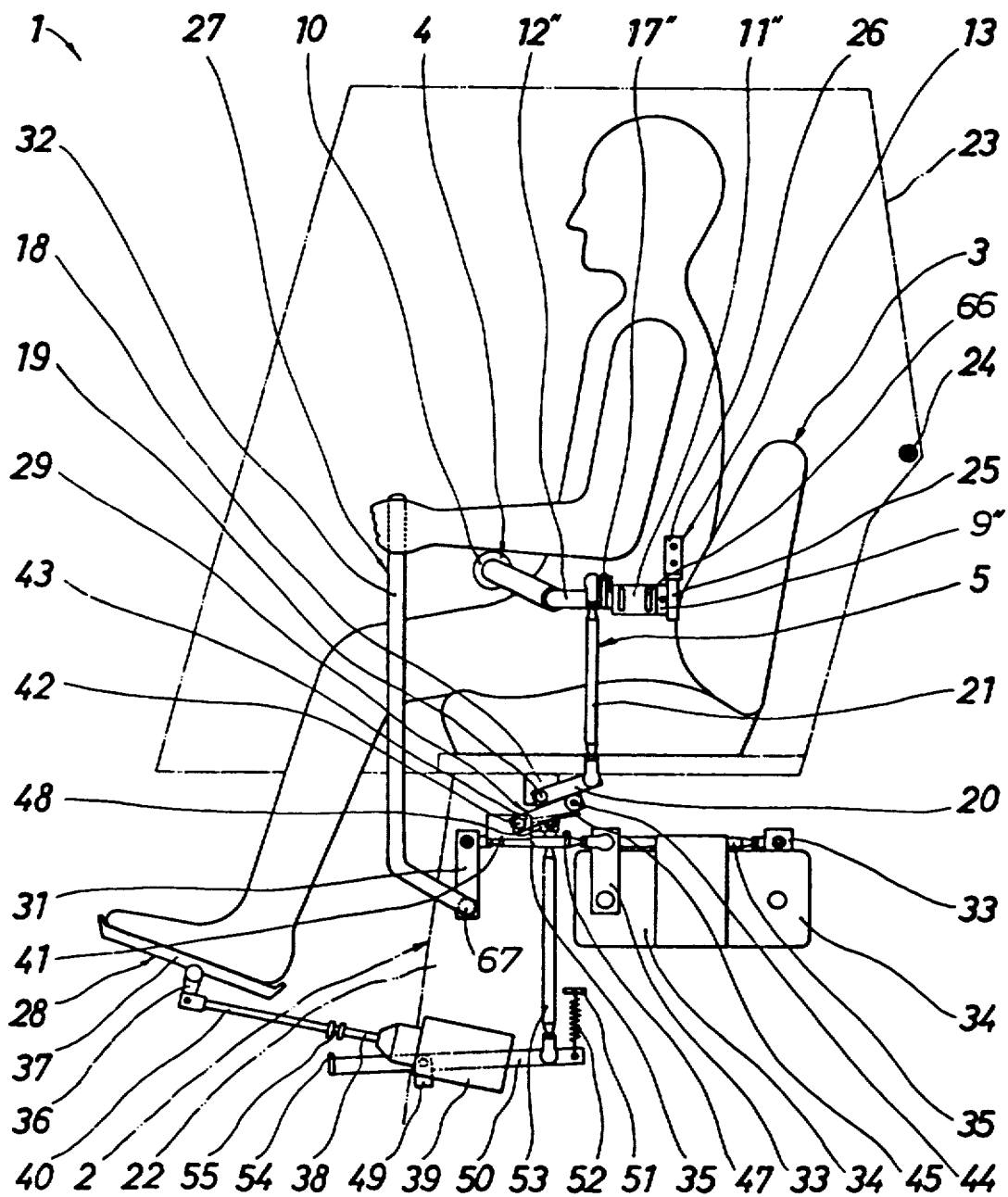
FIG. 6 is a side view of the second embodiment.

FIGS. 4-6 illustrate a second embodiment of the invention wherein the synchronizing mechanism is interlocked with the vehicle run and load controls so that the vehicle may not be started nor its load controls operated unless the restraining bar assemblies 4 are raised. In this embodiment it is not necessary to pull back on a restraining bar assembly before lifting it, and the arrangement is such that the raising of either restraining bar assembly causes the other restraining bar assembly to be raised.

Referring now to FIG. 4, the synchronizing mechanism 5 comprises right and left adjustable links 21 pivotally attached at their bottom ends to right and left arms 20 affixed attached to opposite ends of a rod 19 which is mounted for rotational movement in right and left bearings 18 (only one shown). The arrangement and operation of these parts is exactly the same as described above with reference to FIG. 1 except that bearings 18 are attached to a head guard 23 as shown in FIG. 5.

At each side of the seat, the upper end of the adjustable 20 is pivotally attached to an arm 17" which is affixed to the restraining rod 8 or an extension 12" thereof. Extension 12" serves as a pivot axis, extending parallel to the front-rear axis of the vehicle, about which the restraining bar assembly 4 may pivot when raised by the operator. A boss 11" is firmly secured to the head guard 23 (see FIG. 5) by two support arms 66 and serves as the bearing in which the extension 12" may rotate.

As shown schematically in FIGS. 5 and 6, the vehicle is provided with an operator protection means 23 hereinafter referred to as the head guard. The head guard is pivoted about a pivot 24 extending transverse to the front-rear axis of the vehicle and seat 3 is secured to the head guard. Since bearings 18 and supports 66 are also attached to head guard 23, rotation of the head guard about pivot 24 raises not only the head guard but also seat 3, the restraining bar assemblies 4 and the synchronizing mechanism 5.

At the left side (as viewed in FIG. 4) a member 9" is pinned or otherwise attached to the end of extension 12" so that the extension cannot be pulled axially through boss 11". The facing surfaces of boss 11" and member 9" are flat so that member 9" may rotate relative to boss 11" as the left restraining bar assembly is raised or lowered. A similar arrangement is provide at the right side (as viewed in FIG. 4) except that a rectangular block member 25 is attached to, or formed integrally with, the member 9".

The rectangular block 25 cooperates with one arm of an angled plate 26 attached to the head guard 23 so as to form a holding or retention means for the restraining bar assemblies 4. When the restraining bar assemblies 4 are in their lowered or restraining position an arm plate 26 is substantially parallel to, and presses against a flat side of block member 25. This prevents an accidental or inadvertent raising of both restraining bar assemblies 4. When the operator wishes to leave his seat, he raises up on either (or both if desired) of the restraining bar assemblies 4 with sufficient force to rotate block member 25 against the pressure of plate 26. If the left restraining bar assembly 4 in FIG. 4 is raised, the extension 12" rotates counterclockwise to thereby rotate the left arm 17" downwardly. This motion is transmitted through the left adjustable link 21 and left arm 20 to rotate rod 19. Rotation of rod 19 causes the right arm 20 to move downwardly and this motion is transmitted through the right adjustable link 21 to pull the right arm 17" downwardly. This rotates the right extension 12" in the clockwise direction thereby raising the right restraining bar assembly 4. A similar action occurs when the operator applies the raising force to the right restraining bar assembly.

It should be noted that after the restraining bar assemblies 4 have been raised to an angle of 45 degrees to their initial position, the arm plate 26 will be pressing against a corner of block member 25. As the restraining bar assemblies are raised further, the pressure of the arm of plate 26 will assist the operator in raising the restraining arm assemblies to their vertical positions. Furthermore, once the restraining arm assemblies are raised, the pressure of the arm of plate 26 against the block member 25 will retain both restraining arm assemblies in an upright position.

FIGS. 5 and 6 show a vehicle having a run control means 27 comprising right and left run control levers 32, 32 pivoted about transverse axes supported by the vehicle body 22. The levers have operating arms 31, 31 affixed thereto. The run control means also includes left and right variable hydraulic pumps 34, 34 attached to the body 22 rearwardly of the run control levers 32. As best seen in FIG. 5, each pump has an offset arm 33 attached thereto. The offset arms are connected to the arms 31 by adjustment rods 35, 35.

A lock means 29 for the run control means comprises right and left bearings 41, 41 secured to the body 22, right and left transverse axles 42, 42 supported by the bearings, arms 43, 43 secured to the outer ends of the axles, right and left rollers 44, 44 which are secured to arms 43 and contact the arms 20 of the synchronizing mechanism, right and left arms 45, 45 which are secured to the inner ends of the transverse axles 42, 42, and have engaging cavities or recesses 46, 46 formed therein, and engaging lugs 47, 47 which are provided on the adjustment rods 35, 35 of the run control means.

When the restraining bar assemblies 4 are in their restraining position, the vehicle operator may selectively move the levers 32 to control the hydraulic output of the pumps 34. The pump outputs provide the hydraulic power for running the vehicle. As the operator moves a run control lever 32 to pivot it about pivot 67, the arm 31 is correspondingly pivoted. This motion is transmitted through adjustment rod 35 to rotate the offset arm 33 which controls pump 34 to vary its output.

When a restraining bar assembly 4 is raised, the arm 20 pivots downwardly as previously described. Arm 20 acts against roller 44 to pivot arm 43 and transverse axle 42 thereby pivoting arm 45 downwardly. When arm 45 pivots downwardly, the engaging lug 47 is captured in the recess 46 thereby preventing movement of the adjustment rod 35. Since the movement of the lever 32 is transmitted to pump 34 through the adjustment rod 35, capture of engaging lug 47 prevents operation of pump 34 by the run control lever 32.

The vehicle includes a load control means 28 for controlling operation of those portions of the vehicle that support and move a load. The load control means includes three pedals 37, one of which is shown in FIG. 6. Each pedal is pivotally supported by the body 22 and has a downwardly extending arm 36 that is pivotally attached to an extension 40 of a spool 38 which controls a control valve 39. By pivoting a pedal 37 about its pivot, an operator may cause adjustment of one of control valves 39 and thereby control the flow of hydraulic fluid to a mechanism for effecting manipulation of a load.

A lock means 29 is provided for locking the load control means when the restraining bar assemblies 4 are not in the restraining position. The lock means 29 comprises a bearing 41, transverse axle 42, arm 43 and roller 44 at one side only of the vehicle. In addition, lock means 29 includes an arm 48 secured to the transverse axle 42, a lever 50 pivoted on a bracket 49 which is secured to body 22, and an adjustment rod 53 connected at one end to arm 48 and at the other end to lever 50. As viewed in FIG. 6, a spring 52 is attached to the right end of lever 50, the spring 52 also being attached to a bracket 51 secured to body 22. The left end of lever 50 is provided with an engaging arm 54 for engaging a cavity or recess 55 provided on the spool 38 of the control valve 39. The engaging arm 54 is made long enough to simultaneously engage the recesses 55 on all three spools 38.

The lock means 29 operates as follows. When either of the restraining bar assemblies 4 is raised, this motion causes left arm 20 clockwise as viewed in FIG. 4. The arm 20 presses on roller 44 to depress arm 43. This motion is transmitted through transverse axle 42 to arm 48. As arm 48 pivots, it acts through adjustment rod 53 to pivot lever 50 (FIG. 6) clockwise against the bias of spring 52. As the lever 50 pivots, the engaging arm 54 engages the recesses 55 on the three spools 38. This locks the spools so that they may not be moved even though the operator may attempt to operate one of the pedals 37. Since spools 38 cannot be moved, the outputs of valves 39 cannot be varied to manipulate the load. When the operator lowers the restraining bar assemblies to their restraining position, arm 20 moves free of roller 44 and spring 52 pivots lever 50 counterclockwise as viewed in FIG. 6 to move engaging arm 54 free of the recesses 55.

From the foregoing description it is seen that the present invention provides restraining bar assemblies which are synchronized such that when the operator raises one assembly, the other assembly is also raised. The restraining bar assemblies are pivoted for movement about axes parallel to the front-rear axis of the vehicle at points forward of the operator so that the lifting stroke is shortened and the lifting force reduced as compared to prior restraining bar arrangements. With respect to the embodiment of FIGS. 4-6, the run and load control means of the vehicle are interlocked with the synchronizing means for the restraining bar assemblies so that the run controls and load controls cannot be operated unless the operator has lowered the restraining bar assemblies and thus is protected by them should an accident occur.

While specific preferred embodiments of the invention have been described by way of example, it should be understood that various modifications and substitutions may be made in the described embodiments without departing from the spirit and scope of the invention as defined by the appended claims. For example, the locking lugs need not be located on the adjusting rod 35 but may be provided on other elements such as on the run control levers 32 or the offset levers 33. Also, the run control lock means and the load control lock means need not be mechanical in nature but may comprise a solenoid locking means controlled by a switch which is actuated upon movement of the restraining bar assemblies out of their restraining or horizontal position.

The embodiments of the invention in which an exclusive property or privilege is claimed are defined as follows.

We claim:

1. A vehicle seat occupant restraining device for restraining an occupant in a seat having a seating surface, said device comprising:
   first and second restraining bars;
   first and second support means for pivotally supporting said first and second restraining bars, respectively, for pivoting movement about first and second fixed parallel axes extending on opposite sides of and above said seating surface, said restraining bars being pivotable between an occupant restraining position and a raised position;
   synchronizing means interconnecting said first and second restraining bars for moving said second restraining bar about said second axis as said first restraining bar is moved about said first axis; and,
   an arm rest provided at each side of said seating surface, said first and second support means each having a pivot located within one of said arm rests about which one of said restraining bars pivots.

2. A vehicle seat occupant restraining device as claimed in claim 1 wherein said synchronizing means interconnects said first and second restraining bars whereby an occupant may apply a force to either one of said restraining bars to move both of them.

3. A vehicle seat occupant restraining device as claimed in claim 1 wherein said restraining bars are pivotally supported by said support means so that they are movable between a seat occupant restraining position and a raised position permitting an occupant to leave said seat, said device further comprising holding means for holding said restraining bars in said occupant restraining position or said raised position.

4. A vehicle seat occupant restraining device as claimed in claim 1 wherein each said first and second support means comprises a fixed boss, a pivot support in said fixed boss, and a rotatable boss mounted for rotation on said pivot, one said restraining bars being attached to the rotatable boss.

5. A vehicle seat occupant restraining device for restraining an occupant in a seat having a seating surface, said device comprising:
   first and second restraining bars;
   first and second support means for pivotally supporting said first and second restraining bars, respectively, for pivoting movement about first and second fixed parallel axes extending on opposite sides of and above said seating surface, said restraining bars being pivotable between an occupant restraining position and a raised position; and,
   synchronizing means interconnecting said first and second restraining bars for moving said second restraining bar about said second axis as said first restraining bar is moved about said first axis,
   at least one of said support means including lock means for locking said restraining bars against pivoting movement, said one support means supporting one of said restraining bars for axial movement along one of said axes whereby an occupant may unlock said restraining bars by moving said one restraining bar along one of said axes.

6. A vehicle occupant restraining device as claimed in claim 5 wherein said synchronizing means includes at least two ball and socket pivots.

7. A vehicle seat occupant restraining device for restraining an occupant in a seat, said device comprising:
   first and second restraining bars;
   first and second support means for pivotally supporting said first and second restraining bars, respectively, for pivoting movement about first and second parallel axes extending on opposite sides of said seat, said restraining bars being pivotable between an occupant restraining position and a raised position; and,
   synchronizing means interconnecting said first and second restraining bars for moving said second restraining bar about said second axis as said first restraining bar is moved about said first axis,
   said first and second support means each comprising a fixed boss, a pivot support in said boss, and a rotatable boss mounted for rotation on said pivot, one said restraining bars being attached to the rotatable boss, and,
   said synchronizing means comprising means responsive to rotation of one of said rotatable bosses in one direction for moving the other of said rotatable bosses in the opposite direction whereby said restraining bars rotate downwardly and toward each other or upwardly and away from each other depending on the direction of rotation of said one rotatable boss.

8. A vehicle seat occupant restraining device as claimed in claim 7 wherein said restraining bars are rotatable between an occupant restraining position and a raised position permitting an occupant to leave said seat, and holding means for holding said restraining bars in said restraining position or said raised position.

9. A vehicle seat occupant restraining device as claimed in claim 8 wherein said holding means comprises spring means for urging one of said rotatable bosses into engagement with one of said fixed bosses, the bosses urged into engagement by said spring means having interlocking surfaces which interlock to prevent rotation thereof when said restraining bars are in said occupant restraining position or said raised position.

10. A vehicle seat occupant restraining device as claimed in claim 9 wherein each of said first and second restraining bars has a first portion extending toward the first portion of the other restraining bar in front of said seat and a second portion extending at an angle to said first portion, each of said support means comprising means for rotatably supporting the second portion of one of said restraining bars.

11. A vehicle seat occupant restraining device as claimed in claim 10 wherein first and second arms are affixed to said second portions of said first and second restraining bars, respectively for rotation therewith; and said synchronizing means comprises means responsive to rotation of one of said arms in one direction for rotating the other of said arms in the opposite direction whereby said restraining bars rotate downwardly and toward each other or upwardly and away from each other depending on the direction of rotation of said one arm.

12. A vehicle seat occupant restraining device as claimed in claim 11 wherein said restraining bars are rotatable between an occupant restraining position and a raised position permitting an occupant to leave said seat, and holding means for holding said restraining bars in said restraining position or said raised position.

13. A vehicle seat occupant restraining device as claimed in claim 12 wherein said holding means comprises a block element having first and second flat surfaces and attached to said second portion of one of said restraining bars and an elastic element for bearing against said first flat surface when said one restraining bar is in the occupant restraining position and bearing against said second flat surface when aid one restraining bar is in the raised position.

* * * * *